(12) United States Patent
Guillemin et al.

(10) Patent No.: US 6,567,628 B1
(45) Date of Patent: May 20, 2003

(54) METHODS AND APPARATUS TO DETERMINE PAGE ORIENTATION FOR POST IMAGING FINISHING

(75) Inventors: Gustavo M. Guillemin, Guadalajara (MX); Alejandro Wiechers, Chapalita (MX)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 10/046,529

(22) Filed: Nov. 7, 2001

(51) Int. Cl.[7] ............................................... G03G 15/00
(52) U.S. Cl. ........................ 399/82; 399/407; 399/410
(58) Field of Search ........................ 399/82, 405, 407, 399/408, 410

(56) References Cited

U.S. PATENT DOCUMENTS

| | | | |
|---|---|---|---|
| 4,955,060 A | * | 9/1990 | Katsuki et al. ............. 399/212 |
| 5,839,033 A | * | 11/1998 | Takahashi et al. .......... 399/187 |
| 6,229,984 B1 | * | 5/2001 | Ohtani ........................ 399/407 |

* cited by examiner

Primary Examiner—Quana M. Grainger

(57) ABSTRACT

A method of formatting an electronic representation of a page of a document to be imaged by an imaging device. The method includes determining if the electronic representation of the page is oriented in a predetermined orientation. If the electronic representation of the page is not oriented in the predetermined orientation, the electronic representation of the page is rotated so that the electronic representation of the page is in the predetermined orientation. Thereafter the electronic representation of the page can either be imaged or stored in a computer readable memory. The steps can be performed by a page orientation program which is executed by a processor in an imaging device. The imaging device can include an optical scanner to generate the electronic representation of the page from an original tangible document.

11 Claims, 7 Drawing Sheets

METHODS AND APPARATUS TO DETERMINE PAGE ORIENTATION FOR POST IMAGING FINISHING

FIELD OF THE INVENTION

The invention claimed and disclosed herein pertains to generating images on sheets of media (as in printing or photocopying) and correctly orientation the post-imaging media so that document finishing can be correctly applied.

BACKGROUND OF THE INVENTION

The present invention is directed towards methods and apparatus to facilitate achieving the correct orientation of a sheet of imaged media so that post-imaging "finishing" can be correctly applied to the sheet. More specifically, the present invention is intended for use in photocopies and printers and other devices which generate an image on sheets of media. We will refer to all such devices generally as "imaging devices". The present invention is directed particularly towards digital imaging devices. These devices use a digital file in order to direct the print engine of the imaging device to generate the image represented by the digital file onto the media. The digital file can be transmitted to the imaging device from a remote source, such as a connected computer or a via a communication device. The digital file can also be created by the imaging device when the imaging device includes a scanner which first scans an object (such as a document) and then generates a digital file of the scanned image. Certain imaging devices can both receive digital files from external sources, as well as internally generate the digital file using a scanner. Digital imaging devices typically use an electrophotographic imaging process to generate images on sheets of media, although other processes, such as ink-jet printing and thermal printing, can also be employed. These imaging processes, and the imaging devices which perform them, are all well understood in the art and do not need to be described further herein.

When we use the expression "sheets of media" in the present discussion we mean media on which an image can be generated by the imaging device. For example, sheets of media can include paper, transparencies, envelopes, card stock, labels and other media which can be processed by the imaging device in order to generate an image on the media. Although the present invention pertains to both photocopying and printing processes, we will use the term "copy product" to refer to media on which an image has been generated by an imaging device.

Many advanced imaging devices are configured to apply post-imaging "finishing" to the copy product. For example, such finishing can include stapling multiple sheets of copy product to one another, punching one or more holes in the copy product so that it can be inserted into a binder or the like, and binding sheets of copy product together in the form of a booklet. These finishing processes are performed by what we will term "finishing devices", which are typically integrated into the imaging.device such that the finishing processes are performed automatically or semi-automatically. Such finishing devices are well known in the art and will not be described further herein.

For most finishing processes it is important that the copy product be properly oriented with respect to the finishing device so that the finishing process is correctly applied to the copy product. By way of illustration, FIG. 1A depicts a page 10, or the top page of stack of sheets, of media which can be placed into a document feeder, or on a flat glass bed, for scanning and copying by an imaging device. The document is presented to the imaging device in the orientation depicted, with the top edge 11 of the document 10 on the left as viewed from above by a user. Let us assume that the imaging device is provided with a document sheet feeder, and further that pages of a document to be copied are intended to be placed in the document feeder in a face-up orientation, and in the direction depicted in FIG. 1A. The resulting copy product 20 is depicted in FIG. 2A. The copy product has finishing applied in the way of a staple "S" on the left side 25 of the sheet 20 near the upper edge 21. Three holes "H" are also punched in the copy product 20 along the left side 25 of the document. As can be seen, the finishing has been applied in the "correct" position. That is, based on the orientation of the image consisting of the words "DOCUMENT TO COPY", the staple "S" will allow a reader of the document to flip the pages in the normal right-to-left manner for most Western languages. Further, if the document were placed in a three-ring binder using the holes "H", the document could be read by flipping pages in the same right-to-left manner.

However, if a user places the original document in the document feeder in the orientation as depicted in FIG. 1B, then a different result occurs. FIG. 1B depicts the same document sheet 10 as in FIG. 1A, which is assumed to be placed in the same hypothetical imaging device as described above. That is, the document feeder is configured such that the top edge 11 of the document 10 should be placed facing the left side as viewed from above by the user. However, as seen in FIG. 1B, the document 10 has been positioned with respect to the document feeder such that the bottom edge 17 of the document 10 is facing to the left. This results in the left side 15 of the document 10, and the right side 13 of the document, being reversed from the intended "correct" orientation depicted in FIG. 1A. Ordinarily, if finishing is not to be applied to the finished copy product, then the rotation of the document 10 from the position depicted in FIG. 1A to the position depicted in FIG. 1B is of little consequence. However, when finishing is applied to the copy product, then there is a problem. This is depicted in FIG. 2A which shows the copy product 30 which results when the original document 10 is placed in the orientation depicted in FIG. 1B. Since most finishing devices are relatively fixed with respect to the copy product, the finishing will be applied incorrectly. Specifically, the staple "S" has now been applied to the right edge 35 of the document near the bottom edge 31. Likewise, the holes "H" have been applied along the right edge 35 of the document. As is evident, in order to maintain "correct" positioning of the finishing, the staple should have been applied at the left edge 33 of the document near the top edge 37, and the holes "H" should have been applied along the left edge 33 of the document. While the finishing shown in FIG. 2B still allows the document to be read and held into a bound document, it requires a reader of the document to use an unnatural page turning process to turn pages of the document.

One prior art solution to this problem is to provide a visual aid, typically in the way of a graphic, to facilitate the user in properly orienting the document in the document feeder, or on the scanning glass. This is of some help, but it is still possible for the user to incorrectly position the original document with respect to the imaging device scanning section. Further, if the original document contains more than one sheet, and at least one sheet beneath the top sheet is misoriented with respect to the top sheet, then the misoriented sheet will have finishing applied to the wrong edge, even if the user positions the document correctly using the top sheet as a guide.

Another solution might be to configure finishing devices such that they can be relocated in the event the copy product is presented in an incorrect orientation. This solution is impractical since it would require either a very complex mechanical system to perform the relocation of the finishing device, or a high degree of user input. Another solution is for the user to remove the misoriented copy product and reposition it with respect to the finishing device. While this is feasible, it defeats the purpose of integrating the finishing device in the imaging device, i.e., of removing user intervention to apply finishing. Further, none of these solutions address the problem of an original multi-page document having randomly misoriented sheets. This latter situation is a problem even when no finishing is to be applied to the copy product, since the user will need to reorient the misoriented pages of the copy product.

While the problems described above are typically associated with scanning a stack of sheets for photocopying, it can also occur when a digital file is transmitted to the imaging device for printing. For example, if a user transmits a file to the imaging device for printing and the file has pages which are misoriented, the same problems will result. This can happen for example if the file is generated by scanning a multi-page document which includes misoriented pages.

What is needed then is an imaging device having copy product finishing capability and which achieves the benefits to be derived from similar prior art devices, but which avoids the shortcomings and detriments individually associated therewith.

SUMMARY OF THE INVENTION

The present invention provides methods and apparatus for determining whether a page of an original document is properly oriented so that finishing can be correctly applied to the copy product made from the original document. The original document can be in the form of an electronic representation of the document, or it can be in a tangible form which is thereafter reduced to an electronic form. In any event, the methods of the present invention are directed towards processing the electronic representation of the document, even though the starting document may be in tangible form. In it simplest form, the invention comprises determining whether a page of an original document is properly oriented, and if not, reorienting it. This can be done by performing optical character recognition on the electronic representation of the page to determine if the characters are oriented in a manner consistent with the preferred orientation of the document page. The method can be applied to a single-page document, to only the first page of a multi-page document, or to all pages of a multi-page document. In the latter case the process can be used to orient pages of a copy product even when a post-imaging finishing process is not to be applied.

More specifically, a first embodiment the present invention includes a method of formatting an electronic representation of a page of a document to be imaged by an imaging device. The electronic representation of the page can be in the form of a digital data file which can result from scanning a tangible document, or it can be a file transmitted to the imaging device from an external source, such as a computer. The method includes determining if the electronic representation of the page is oriented in a predetermined orientation. If the electronic representation of the page is not oriented in the predetermined orientation, then the electronic representation of the page is "rotated" so that the electronic representation of the page is in the predetermined orientation. This step of rotating the document page can be performed by altering the digital file, or it can be performed by instructing the imaging device to read the digital file in different order such that copy product is generated in a rotated manner. The method also includes either imaging the rotated electronic representation of the page to produce the copy product, or storing the rotated electronic representation of the page in a computer readable memory so that it can be imaged at a later time. The step of determining if the electronic representation of the page is oriented in the predetermined orientation can be performed, for example, by using optical character recognition software.

When the rotated electronic representation of the page is to be imaged to produce a copy product, the method can further include determining whether a finishing process is to be applied to the copy product. If not, then the step of determining if the electronic representation of the page is oriented in the predetermined orientation can be suspended. Likewise, the step of rotating the electronic representation of the page can also be suspended if no finishing process is to be applied to the copy product. In this manner the process of generating the final copy product is not delayed by the processing time required to determine whether the page is correctly oriented, since the effect of misorientation is not as significant as when finishing is to be applied to the copy product.

When the electronic representation of the page represents the first page of a multi-page document, the remainder of which is represented by a secondary electronic representation, then the method can include rotating the secondary electronic representation when the electronic representation of the page is rotated. That is, the assumption is made that if the first page is misoriented, then all subsequent pages are also misoriented. This can occur when an original document is placed in a document feed tray in the incorrect position. However, it can also occur that random pages in the multi-page document are misoriented, in which case the method can include determining if the electronic representation of each page of the multi-page document is misoriented. Those pages which are determined as being misoriented can then be rotated, while those pages which are not misoriented are not rotated. This latter process is slower than the aforementioned process where only the first page is considered. Therefore, preferably an imaging apparatus which is configured to implement the methods of the invention allows a user to select whether to apply the formatting feature to correct orientation, to apply the formatting feature to only the first page of a multi-page document, or to apply the feature to all the pages of a multi-page document.

For a multi-page document, the method can also include determining if the electronic representation of each page is oriented in the predetermined orientation by using optical character recognition ("OCR") on a preselected portion of each page. The OCR can be performed using OCR software. Further, the OCR software can be used to determine whether a footer is present in the preselected portion of the page. That is, the top and bottom portion of a first page can be examined using the OCR software. If text indicative of a footer is detected, then the method includes determining whether the orientation of the footer indicates whether the page is misoriented or not. If the orientation of the footer determines that the page is misoriented, then the page is rotated. Subsequent pages of the document can be likewise examined and rotated if the footer is indicated as being in the incorrect position. Preferably, this feature can be selected and deselected by a user of the imaging device, such as through a control panel or a computer connected to the imaging device. Further, since detection of the footer can comprise only checking for the presence of absence of text in the preselected portion of the page, a simpler OCR process can be used. This simpler process can be termed "optical character determination", since all it must do is determine whether a character is present or not, and does not need to determine what the character is.

A second embodiment of the present invention provides a method of generating an image from an electronic representation of a page of a document to be imaged by an imaging device. The method includes performing optical character recognition on at least a portion of the electronic representation of the page to obtain a digital representation of at least one character from the electronic representation of the page. The digital representation of the at least one character is then compared to a set of recognized characters. The method includes determining if the digital representation of the at least one character matches a character in the set of recognized characters. These last two steps can be performed using OCR software, for example, which includes a library of recognized characters. If the digital representation of the at-least-one character does not match a character in the set of recognized characters, the electronic representation of the page is rotated in the manner described above with respect to the first embodiment of the invention. Thereafter the electronic representation of the page is imaged by the imaging device to produce a copy product. Alternately, or in addition to generating the copy product, the electronic representation of the page can be stored in a computer readable memory device. The method can also include first optically scanning a document to generate the electronic representation of the page.

Further, the optical character recognition can performed on at least a portion of the electronic representation of the page to obtain digital representations of at least three characters from the electronic representation of the page. The digital representations of the at-least-three characters can then be compared to the set of recognized characters. It is then determined whether a majority of the digital representations of the at-least-three character matches characters in the set of recognized characters. If the majority of the at-least-three characters do not match characters in the set of recognized characters, then the electronic representation of the page is rotated. That is, the method can use statistical sampling and analysis on a plurality of characters to determine whether the page is misoriented. This addresses the situation where a character, which has been selected for analysis from the electronic representation of the page, can match a character from the character set even when the selected character is inverted and mirrored. For example, an inverted and mirrored letter "I" will appear the same whether it is inverted and mirrored or not, depending on the font used. Accordingly, by sampling a number of characters, the probability is reduced that the page will not be rotated when it should be rotated.

If it has been determined that the digital representation of the at-least-one character does not match a character in the set of recognized characters, then the method can include the following additional analysis. A determination can be made whether rotating the digital representation of the at-least-one character by ninety degrees in a first direction will cause the digital representation of the at-least-one character to match a character in the set of recognized characters. If not, the electronic representation of the page is rotated. This step addresses the situation where one or more of the pages in the original document is oriented in a "landscape" format. That is, if the method makes the assumption that all of the pages of the document are in portrait format, then most of the OCR performed on the character selected for comparison to the set of characters will indicate that the page is misoriented. However, if, before rotating the page, the character is first rotated ninety degrees in a first direction (which corresponds to a correct orientation for a page in landscape format) and then compared to the character set again, it can occur that the selected character now matches a character in the character set. In a like manner, an additional check can be performed by rotating the selected character ninety degrees in a second direction from its initial position and then comparing it to the character set. If the rotated character does not match, then it is indicative that the page is in landscape format and is correctly oriented.

A third embodiment of the present invention provides for an imaging device for generating a copy product from an electronic representation of a page of a document. The imaging device includes an imaging section configured to generate the copy product from the electronic representation of the page of the document, and a processor configured to execute steps of a computer executable program. The imaging device also includes a computer readable memory device which has a page rotation algorithm stored therein. The algorithm comprises a series of computer executable steps configured to be executed by the processor to do the following: (1) determine if the electronic representation of the page is oriented in a predetermined orientation; and (2) if the electronic representation of the page is not oriented in the predetermined orientation, to rotate the electronic representation of the page so that the electronic representation of the page is in the predetermined orientation. That is, the algorithm can be configured to perform the methods of the present invention, as set forth herein. The page rotation algorithm (also described herein as a "page orientation program") can be an optical character recognition program. Further, the imaging device can also include an optical scanner configured to optically scan a tangible pace of an original document to thereby generate the electronic representation of the page of the document.

The page rotation algorithm can include all of the features described above with respect to the methods of the present invention. For example, it can be configured to determine whether the electronic representation of only the first page of a multi-page document is oriented in the predetermined orientation, or it can be configured to determine if the electronic representation of each page is oriented in the predetermined orientation. Preferably, the page rotation algorithm can perform both of these functions, which can be optionally selected to be executed (i.e., enabled or disabled) by a user. Likewise, the page rotation algorithm can be further configured to determine if the electronic representation of the page is oriented in one of a landscape format or a portrait format. Preferably this feature can also be enabled or disabled by a user.

The imaging device can further include a finishing device configured to apply a finishing process to the copy product. For example, the finishing device can be a stapler, a device for punching holes in the copy product, or a device for binding the edges of the copy product in a booklet format. Preferably, the finishing device is selectable between an enabled state to apply the finishing process to the copy product, and a non-enabled state to not apply the finishing process to the copy product. In this case the page rotation algorithm is preferably configured to be disabled when the finishing device is in the non-enabled state. That is, if finishing is not to be applied, then generally the page rotation feature is not desired, and the copy product can be generated in a shorter amount of time. However, if pages in a multi-page document include pages which are misoriented as well as pages which are correctly oriented, then a user can elect to enable the page rotation program even if no finishing is to be applied to the copy product to thereby put all of the sheets of the copy product into the correct position.

These and other aspects and embodiments of the present invention will now be described in detail with reference to the accompanying drawings, wherein:

DETAILED DESCRIPTION OF THE INVENTION

Figure 1B:
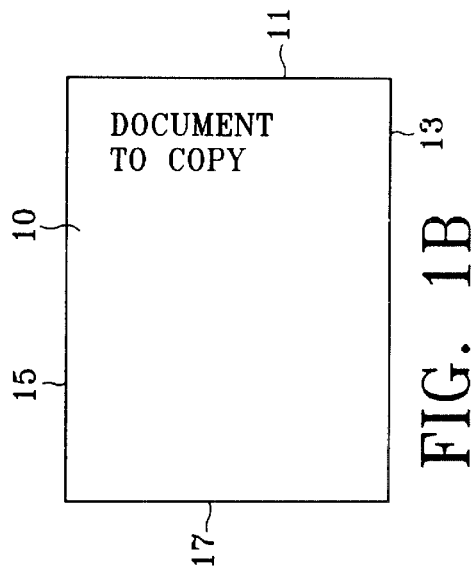
FIG. 1B depicts the document of FIG. 1A but oriented in a different particular way as presented to the imaging device.
Figure 2B:
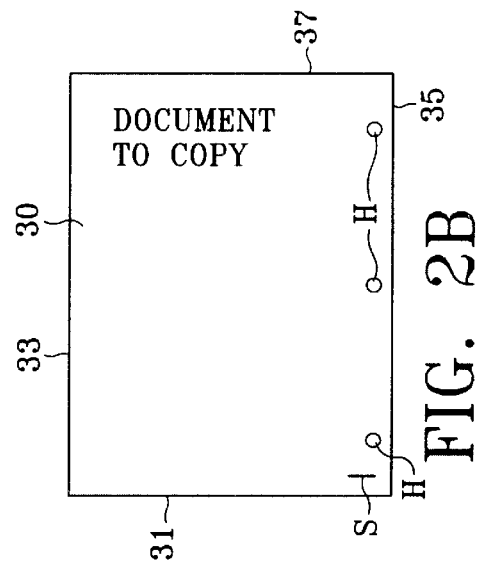
FIG. 2B depicts a copy product generated by an imaging device resulting from an original document oriented as depicted in FIG. 1B.

The present invention provides methods and apparatus for detecting the orientation of a page to be imaged by an imaging device, and changing the orientation of the page to comply with a predetermined, preferred orientation. In general, a page of a document is provided in an electronic format, such as a digital data file. A processor then executes a program to determine whether the page, as represented in the electronic format, is presently oriented in the preferred orientation and, if not, to re-orient the page to the preferred orientation. By way of an introductory example, in one specific, non-limiting embodiment, an original document in tangible form can be placed into a document feeder of an imaging device. A scanner in the imaging device then reduces the document to a digital file. Optical character recognition is then performed on at least a portion of a page of the document (i.e., on a portion of the digital file) to determine if the page is correctly oriented. The optical character recognition can be performed by a computer or a processor using optical character recognition software. If is determined that the page is misoriented, then the digital representation of the page is "rotated" to the correct orientation and thereafter printed. The digital representation of the page can be "rotated" by modifying the digital file to reverse the order in which the page is represented in the file, or by changing the order in which the digital file is transmitted to the print engine in the imaging device for subsequent imaging (i.e., printing).

As described above, the present invention is useful for imaging devices, by which we mean any device which can use an electronic representation of an image to generate a tangible form of the image on a sheet of media. We will use the expression "document" to mean the source of the image. Thus, a document can be an original document in tangible form having one or more pages. A document, as used herein, can also mean an electronic representation of a tangible document. A document can have one or more pages containing images, such as text and/or graphics. The imaging device can generate a tangible form of a page or pages of the document (or only selected portions thereof) as a "copy product" comprising printed sheets of media. We have described what we mean by "sheets of media" in the Background section, above. By "copy product" we do not mean to imply that the imaging device is a photocopier, but only that the image has been reduced to tangible form. Further, an "imaging device" can also be configured to store the document as an electronic file rather than generating a copy product of the document. Thus, the term "imaging device" is also meant to include devices commonly known as "scanners" which optically scan an original tangible document and reduce the original document to an electronic representation thereof. This electronic representation of the original document can then be stored on a computer readable memory device or reduced to a tangible form as a copy product.

The present invention is particularly useful for imaging devices which are provided with a post-imaging finishing device or devices. (We have described what we mean by "finishing device" in the Background section, above.) Thus, the present invention reduces the chance that post-imaging finishing will be applied at an incorrect position on a copy product. However, the present invention can also used to facilitate correct orientation of multiple pages in a copy product, even when post-imaging finish is not to be applied. Further, the present invention can be used when an original document is scanned into an electronic format to orient the pages in the electronic format so that they can be viewed or later printed in a preferred orientation.

We will now describe the present invention by way of specific examples with respect to the attached figures.

Figure 3:
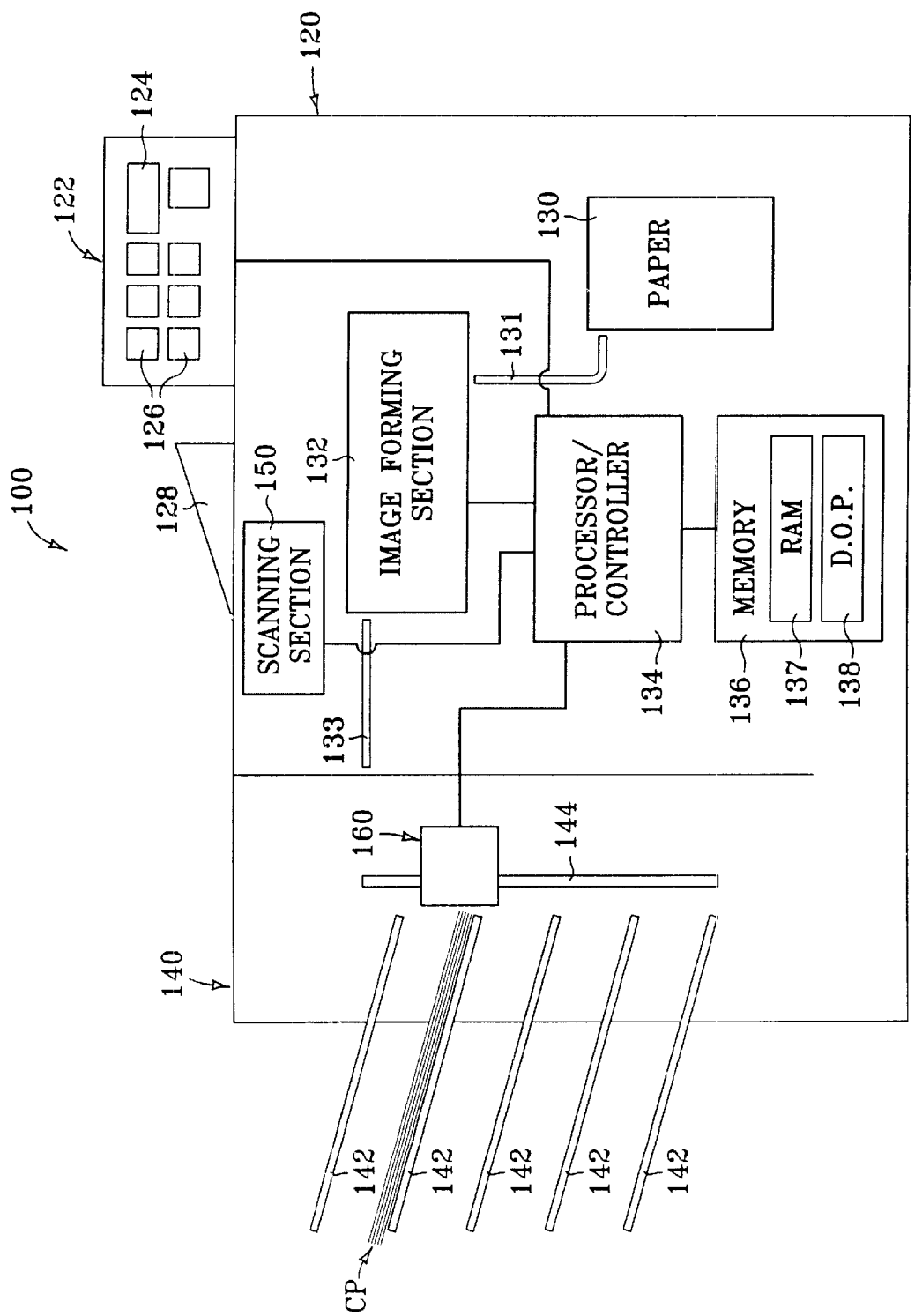
FIG. 3 depicts a side elevation schematic of an imaging apparatus which can be used to implement the methods of the present invention.

Turning to FIG. 3, a side elevation schematic view of an imaging device 100 which can be used to implement the present invention is depicted. The imaging device depicted in FIG. 3 can be considered as a photocopier, although as describe above, it can be other devices as well. The imaging device 100 of FIG. 3 includes an imaging portion 120 and a finishing portion 140. The imaging portion is configured to receive a document in a tangible form in a document input tray 128. Pages of the original document are then scanned by the scanning section 150 which transmits a (typically) analog form of the document pages to a processor or controller 134. The processor converts the analog representation of the document page to a digital format and stores it in the random access memory ("RAM") portion 137 of the computer readable memory device 136. The memory device can be any known computer readable memory device, such as, for example, a disk drive, a microchip, an optical disk, or a magnetic tape, or any combination of known memory devices. The memory device 136 can also contain computer executable programs to allow the processor 134 to control the various functions of the imaging device, including controlling an image forming section 132. The image forming section 132 is used to generate a tangible copy product from the (digital) electronic representation of pages of the document. The imaging section 132 can be, for example, an electrophotographic imaging section (more commonly known as a "laser printing"), or it can use a wet-ink imaging process (commonly known as "ink-jet printing), or any other known imaging processes, such as thermal imaging. The imaging device 100 can further include a user interface 122 which allows a user to provide instructions via input points 126 (for example, keys, buttons, or a touch-screen). The user interface 122 can also include a display 124 to allow the processor 134 to display information to a user.

To generate the copy product, the processor 134 transmits the electronic representation of the document to the imaging section 132. Media, such as paper 130, is moved along paper path 131 to the imaging forming section 132 where the image is formed on the media. Thereafter the media is moved in paper path 133 to the finishing portion 140 of the imaging device 100. The finishing portion 140 can include paper output trays 142 which can receive the copy product "CP". The finishing section 140 can also include a finishing device 160 which can be, for example, a stapler, a hole puncher, or an edge binder. The finishing device can move vertically in a track 144 to thereby access copy product in any of the output trays 142.

The imaging device 100 depicted in FIG. 3 includes, in the memory device 136, a page orientation program (also described herein as a "document orientation program") which can be executed by the processor 134 to implement the method of the present invention by way of a page rotation algorithm. It will be understood that the page orientation program 138 can be stored in a device external to the imaging device, such as a computer, and that the program 138 can be executed by a processor outside of the imaging device 100. It will also be appreciated that the imaging device 100 does not necessarily need to use a tangible document in order to generate the copy product CP, but can receive an electronic file from an external source, such as a computer or via a communications device or a network.

Figure 4:
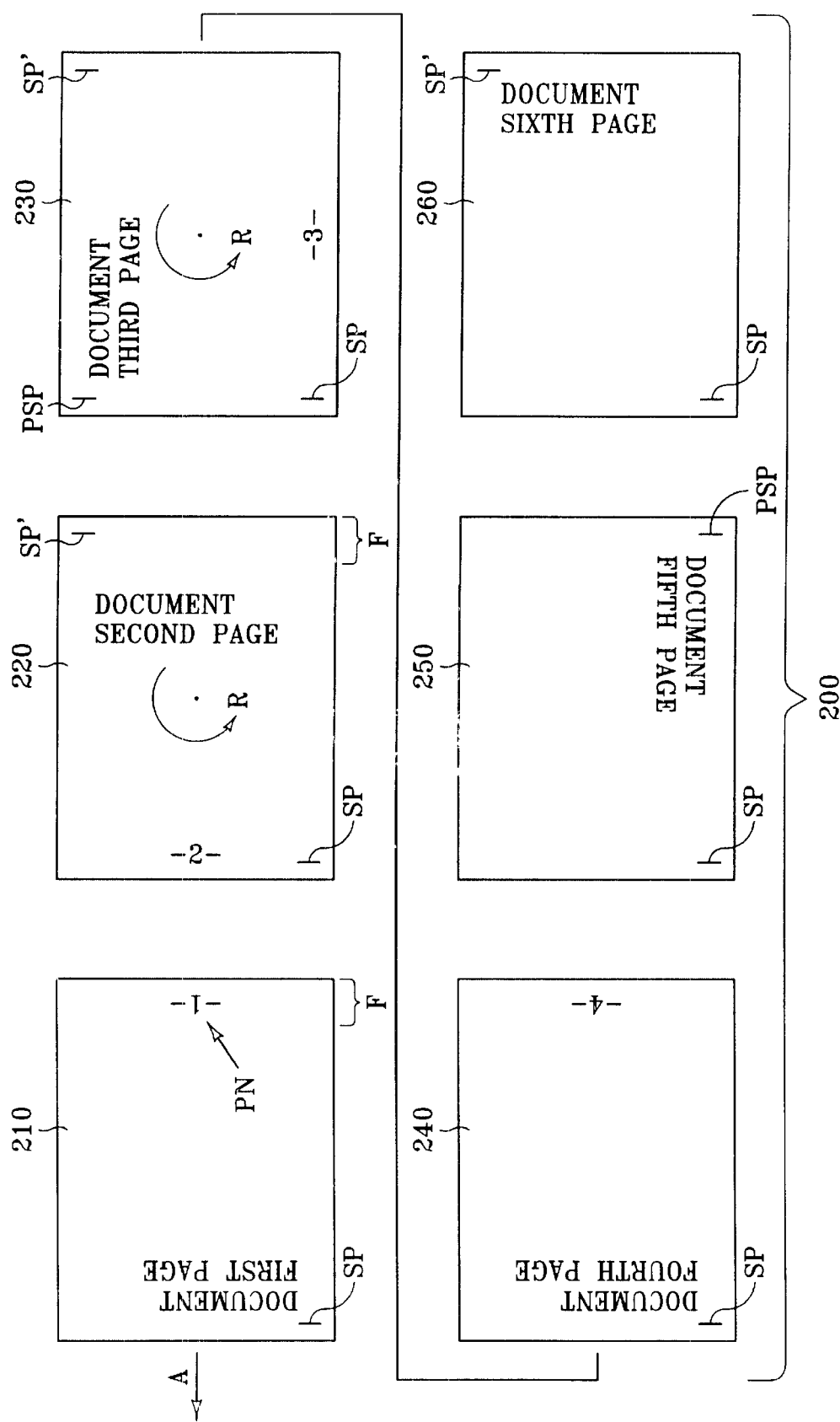
FIG. 4 depicts sheets of a document to be copied by an imaging apparatus.

Turning to FIG. 4, a document 200 is depicted as a series of pages in a plan view. The document 200 can be a tangible document to be scanned, as for example by the optical scanner 150 of FIG. 3, or it can be an electronic representation of pages of a document. Assuming it is a tangible document to be placed in the input tray 128 of the imaging device 100 (FIG. 3), then the pages of the document 200 are fed in the direction of arrow "A" of FIG. 4. Further, for illustrative purposes, assume that finishing is to be applied to the copy product generated from the copy 200. More specifically, assume that a staple is to be placed in the stack of sheets of the copy product at the position indicated by "SP" in each of the pages of the document 200. Accordingly, the first page 210 of the document is correctly oriented with respect to the scanning device (not shown) to that the staple will be correctly positioned with respect to the copy product. However, it can be seen that the second page 220 of the document 200 is rotated 180 degrees from the correct orientation, and, unless the page 220 is rotated 180 in the direction indicated by the arrow "R" (or in the opposite direction), the staple will be positioned improperly for this page. Thus, when the document 200 is reduced to an electronic format, such as a digital file, then the page orientation program (138, FIG. 1) will cause page 220 to be rotated 180 degrees about an axis perpendicular to the plane in which the page 220 lies so that the staple will appear in the position SP' with respect to the contents of the page.

With respect to the third page 230 of the document 200, the contents of this page are applied to the page such that it is best viewed in "landscape" format, whereas pages 210 and 220 are best viewed in "portrait" format. Accordingly, the preferred staple position for page 230 is that indicated by "PSP". However, the staple can only be effectively applied at staple positions SP and SP', since rotating the page 230 by ninety degrees may cause part of the text to be lost. In these situations, convention is to apply the staple to the landscape format page at staple position SP'. Accordingly, the electronic representation of page 230 will need to be "rotated" 180 degrees in direction "R" to place it in the desired orientation for printing. The fourth page 240 is positioned correctly as is the first page 210, and therefore no image processing will be required. The fifth page 250 is another landscape format page, but is rotated 180 degrees form the landscape page 230. While the preferred staple position for page 250 is that indicated by PSP, as explained above, this cannot be achieved without image reduction or other complex processing or paper handling, and therefore the staple position SP is the acceptable position, and the page will be left in the orientation in which it is shown. Finally, the sixth page 260 should be rotated as described above with respect to page 220.

Another condition which can exist, but is not depicted in FIG. 4, is where a sheet of the original document is "upside-down" (i.e., rotated 180 degrees about an axis which lies in the plane of the sheet) such that the text is on the wrong side of the sheet to be presented to the scanner. This situation can be addressed by providing a dual-side optical scanner as the scanner 150 of FIG. 3. The electronic representation of the "upside-down" page can then be "turned over" by using the second side of the document as the first side, and visa versa.

As described above, FIG. 4 illustrates some conditions which can be encountered by the present invention. Since the present invention uses an executable program in order to perform the re-orienting of the electronic representation of the page(s) of the document, it is apparent that the more processing of the document image that is performed, the slower the process will be, which will result in a concomitant delay in producing the copy product. Accordingly, the document page orientation program 138 of FIG. 3 can be configured to only perform a simple analysis of the document, which will result in relatively short time-to-copy-product times. (By "time-to-copy-product" we mean the time between the initialization of the document scanning process and the time the final copy product is available to the user.) However, a simplified page orientation program may not always reposition the pages correctly. For example, if the page orientation program is configured to consider only the first page of a scanned document, and all of the pages are misoriented in the same direction (as can occur when a document is incorrectly positioned in the document feed tray 128 of FIG. 3), then the simplified program produces an acceptable result in a relatively short time. However, if a document includes pages, some of which are misoriented and some of which are not, then the copy product will be unacceptable. For example, with respect to the document 200 of FIG. 4, pages 220, 230 and 260 will be incorrectly positioned in the final copy product if only the first page 210 is considered by the page orientation program. However, if the page orientation program is configured to perform a more detailed analysis of the document (which will, for example, cause pages 220, 230 and 260 of the document 200 to be properly oriented in the copy product), the time-to-copy-product time will be increased, but a more acceptable copy product will be produced. Therefore, preferably the page orientation program 138 allows a user to select at least two different configurations of the page orientation program, depending on the user's knowledge of the original document and the desired time-to-copy-product.

Figure 8:
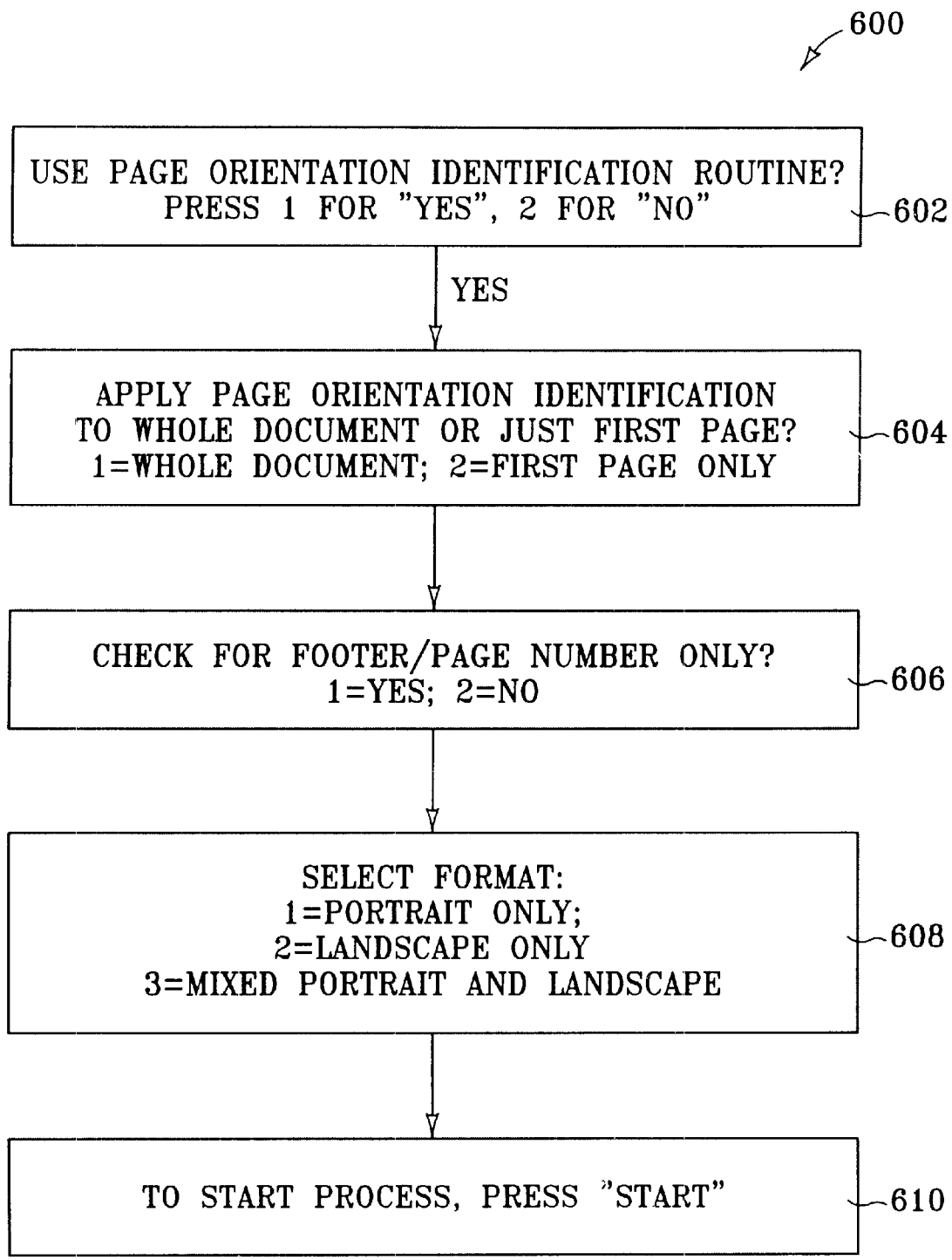
FIG. 8 depicts a schematic diagram of a user menu which can be accessed by a user to select various options associated with an implementation of the present invention.

FIG. 8 depicts a schematic diagram of a menu 600 which can be presented to a user to allow a user to select the level of page orientation processing required, provided that the page orientation program is configured to support the various levels of processing as well as the selectability of the level of processing. The menu windows depicted in FIG. 8 can be displayed to a user using the display 124 of FIG. 3, for example, or they can be displayed on a computer screen of a computer attached to the imaging device 100. The user can, for example, enable the menu 600 (FIG. 8) by accessing one of the user input points 126 on the user console 122 (FIG. 3). The first option 602 presented to the user in the exemplary menu 600 is whether the user desires to use the page orientation identification routine (i.e., to enable the page rotation algorithm 138 of FIG. 3). If the user selects "1", corresponding to "Yes", then menu step 604 is displayed. Menu step 604 allows a user to select whether the page orientation process is to be applied to the whole document, or only the first page of the document. The next menu step 606 allows a user to determine whether the page orientation program will check only for page numbers or footers, or whether it will check the entire page. (This process will be described further below). At menu step 608 the user can select whether the page orientation program will be used for original document pages which are all in portrait format, all in landscape format, or in a mixed format (as depicted in FIG. 4). Once the user had made the selections, then at step 610 the user instructs the imaging device (100, FIG. 3) to begin the process of scanning the document, performing page orientation processing as instructed by the user, and generating the copy product.

Figure 1A:
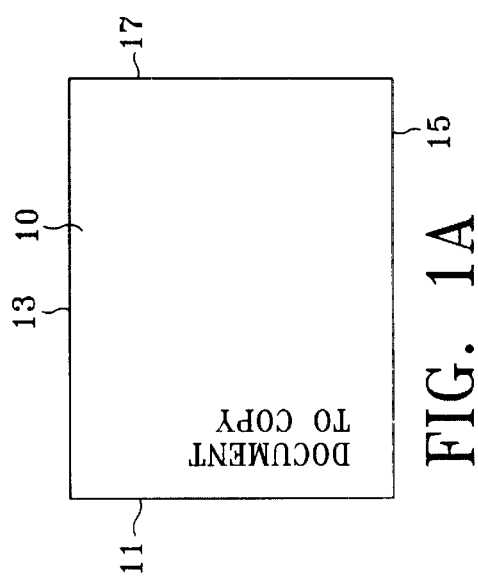
FIG. 1A depicts a document to be copied by an imaging device and oriented in a particular way as presented to the imaging device.
Figure 2A:
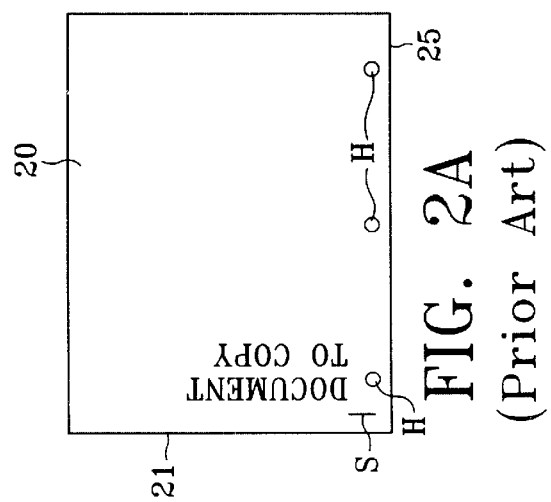
FIG. 2A depicts a copy product generated by an imaging device resulting from an original document oriented as depicted in FIG. 1A.

Note, however, that the user can first scan a document to produce the electronic format or the document. The electronic format of the document can then be stored in the RAM memory device 137 (FIG. 1). Thereafter, the user can select the level of page orientation processing to be applied. In this latter variation the page orientation program can be provided with a time-estimating algorithm to notify the user of the approximate (or exact) amount of time which will be required to perform the processing and generate the copy product, based on the size of the document file and the level of processing requested. A user can then elect to modify the level of selected processing based on the estimated time.

The page orientation program can also be configured to be engaged automatically when a user elects to apply post-imaging finishing to a copy product. Preferably, however, the imaging device is configured to allow the user to defeat the automatic engagement of the page orientation program if he or she so desires.

Figure 5A:
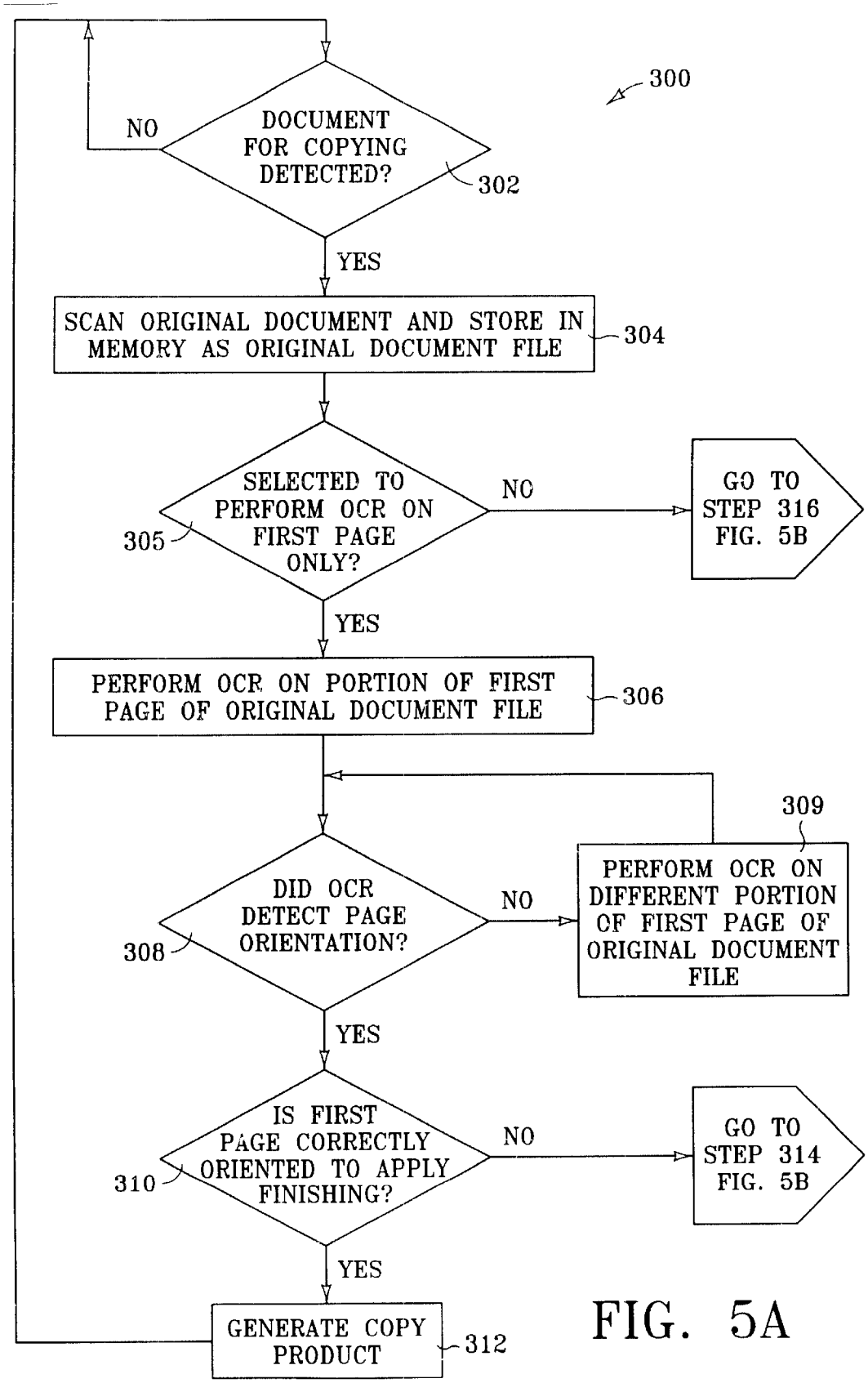
FIGS. 5A and 5B together depict a flowchart of one method in accordance with the present invention.
Figure 5B:
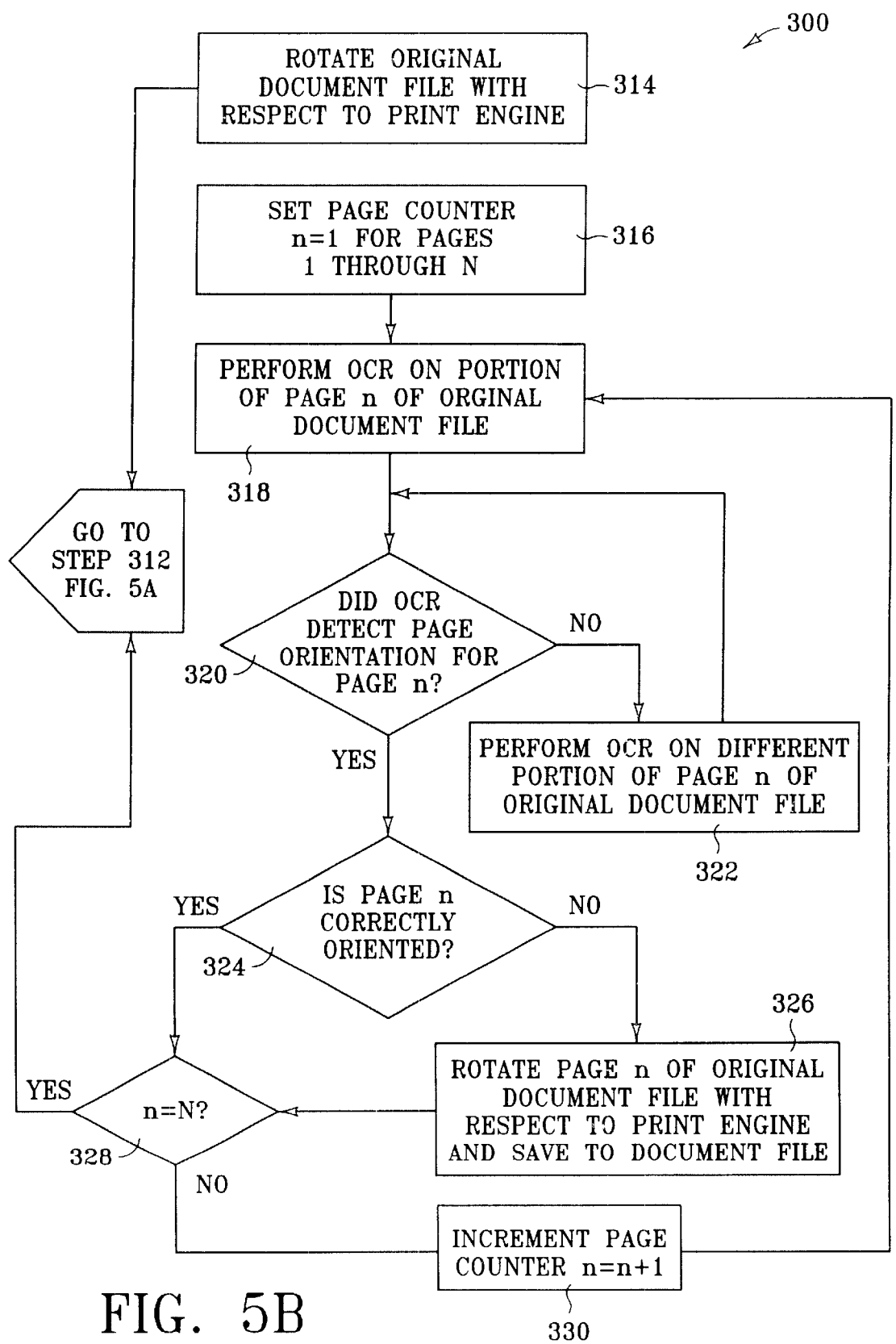

We will now describe an exemplary implementation of one embodiment of the present invention. This implementation is depicted in FIGS. 5A and 5B which, together, show a flowchart 300 of steps which can be performed to implement the embodiment of present invention. These steps can be performed by reducing them to a set of computer executable instructions (i.e., a "program"), and more specifically, the page orientation program (or "page rotation algorithm") 138 of FIG. 1. This program can be stored in a computer readable memory device (such as memory device 136 of FIG. 3), and can be executed by a processor (such as processor 134 of FIG. 3). It is understood that the flow chart 300 is exemplary only and should not be considered as limiting the scope of the invention. Additional steps, different steps, or fewer steps can be used, and the steps can be rearranged from that depicted, all within the spirit of the present invention.

The flow chart 300 is based on using an imaging device, such as 100 of FIG. 3. Step 302 of the flow chart is based on copying a tangible original document, and queries whether a document has been detected (as for example, by being placed in the document feed tray 128 of FIG. 3). If no document is detected, the program returns to step 302 to again check for the presence of a document. If a document is detected, then at step 304 the document is optically scanned (e.g., by scanner 150 of FIG. 3) and stored in computer readable memory (e.g., RAM 137, FIG. 3) as the original document file. This step can include an interrupt such that a user must take action to cause the scanning to occur (such as by pressing a "start copying" button).

The flow chart 300 assumes that a user can select a level of page processing, as described above with respect to FIG. 8, and further, that a user has in-fact selected the page orientation process to be performed. Thus, at step 305 the processor queries to determine whether the page orientation processing is to be applied to all pages of the document, or just the first page. If only the first page is selected for processing, then at step 306 the page rotation algorithm is applied to a first portion of the first page of the document file. In this example the page rotation algorithm performs optical character recognition ("OCR") to determine if the document page is correctly oriented (i.e., oriented in a predetermined orientation) or misoriented. (The process of performing optical character recognition to determine the orientation of a page will be described further below). At step 308 the processor determines whether the optical character recognition, performed in step 306, has successfully determined the orientation of the page. If not, then at step 309 optical character recognition is applied to a second, different part of the first page to determine if the document page is correctly oriented. This process continues between steps 308 ("orientation determined?") and 309 ("perform OCR on different portion of first page") until, at step 208, the page orientation has been determined.

This process described between steps 306, 308 and 309 (i.e., performing OCR on different portions of the first page until the orientation is determined) is configured to reduce processing time of the page orientation program. That is, rather than perform OCR on the whole page, it is only performed until the orientation is determined. Further, the process can include first performing OCR on the selected portion, and then performing OCR on a representation of the portion which is rotated 180 degrees from the original representation. Thus, if the program does not detect page orientation based on performing OCR on the original representation of the portion being analyzed, but does detect page orientation based on performing OCR on the rotated representation of the portion being analyzed, then there is a high probability that the page is misoriented.

Once the orientation of the first page of the document is determined at step 308, then at step 310 a query is performed to determine whether the page is oriented to correctly apply finishing to the copy product. (Note that it is assumed that finishing is being applied, since only the first page is being analyzed for page orientation; if finishing were not to be applied, then it would be essentially irrelevant whether the first page were misoriented or not.) If the first page is correctly oriented, then at step 312 the copy product is generated (for example, by using the imaging section 132 of the imaging device 100 of FIG. 3). However, if the first page is misoriented (as determined at step 310) then at step 314 (FIG. 5B) the original document file is "rotated" with respect to the print engine (i.e, the imaging section 132, FIG. 3) and the copy product is generated at step 312 (FIG. 5A). The process of "rotating the original document file with respect to the print engine" can be performed in a number of different ways. For example, the document file can be transmitted to the imaging section (132, FIG. 3) from the memory device (136, FIG. 3) in an essentially reversed order so that the page is printed in a reverse order (and with the text or image reversed) from the way in which it is organized in the document file. In another variation, the document file can first be reconfigured (as for example, by processing using the processor 134) so that the file is organized with the correct orientation. For example, if the characters on a page are represented by a data file comprising a binary matrix, then the matrix merely is inverted and mirrored in order to have it reconfigured to thereby "rotate" the represented characters by 180 degrees.

If, at step 305 (FIG. 5A), it is determined that the page orientation program is to be applied to the whole document, and not just the first page, then at step 316 (FIG. 5B) a page counter (such as in RAM 136, FIG. 3) is set to count pages n=1 through N for a document of "N" pages in length. Thus, the page rotation algorithm will be applied for each page 1 through N of the document in a manner similar to that describe above with respect to applying the process to only the first page, but further including processing of a secondary electronic representation of the document (being the pages following the first page). Specifically, at step 318 OCR is performed on a portion of page "n" (i.e., on a portion of the electronic representation of the page associated with page "n"), in the manner described above with respect to step 306. Step 320 checks to determine whether the page orientation has been determined and, if not, OCR is performed on additional portions of page "n" at step 322 until the page orientation is determined. Once the orientation is determined, at step 324 the program checks to determine whether it is the correct orientation. If not, the page is "rotated" to the correct orientation at step 326. Steps 320, 322, 324 and 326 are all performed in the manner describe above for respective steps 308, 309, 310 and 310. However, unlike step 310, step 324 does not consider whether the page is oriented correctly for finishing, since the process can be performed with respect to a multi-page document (steps 316 through 326) merely for the purpose of correctly orienting pages in a multi-page document having pages with mixed orientation.

After page "n" of the multi-page document has been correctly oriented at step 326 (or determined to already be correctly oriented at step 324), then the page orientation program moves to step 328 and checks to determine whether page "n" is page "N", being the last page of the multi-page document. If page "n" is the last page, then the program proceeds to step 312 (FIG. 5A) to generate the copy product. However, if at step 328 (FIG. 5B) it is determined that page "n" is not the last page "N" of the multi-page document, then at step 330 the page counter is incremented by the value of one, and the process of optical character recognition and page orientation determination is performed for the next page. This process is continued until each page of the multi-page document has been check for orientation, and the orientation corrected if it is determined that the page is not correctly oriented. Once the whole document has been processed, it can be imaged at step 312 (FIG. 5A).

In one variation, at steps 306 (FIG. 5A) and 318 (FIG. 5B) wherein the program checks a first portion of the document page to determine if the document page is correctly oriented, the program can perform the OCR on a preselected portion of the electronic representation of each page to determine whether a footer is present in the preselected portion. That is, with respect to FIG. 4, the program can be configured to consider only portion "F", as indicated on pages 210 and 220. This is a portion of the page where a footer is likely to be found. The footer can include such information as page number ("PN", as on page 210), document title, date, and other information. Since many documents contain a footer, this can be a useful portion of the document to use to determine orientation of the page. For example, the portion of the page where the footer can reside can include the bottom 20 mm (approx. 0.8 inch) of a document page. In this way, the page orientation program does not need to performed OCR on the footer-area portion of the document page, but can be configured to determine only whether or not information is present in this area. If information is determined to exist in the footer portion "F", then it is indicative of a footer, and thus the bottom of the page. This method thus allows a quick determination to be made of the orientation of the page, and thus the process can be much more quickly applied to a multi-page document without the need to apply time consuming OCR on each page. However, if a header is present (e.g., as applied to a document originally generated by a facsimile machine), as well as a footer, this method can be defeated. Therefore, preferably the page orientation program allows a user to select or deselect the option to check the page for headers and footers, as indicated by step 606 of the user menu 600 of FIG. 8. In one variation, the page orientation program can check for the presence of a footer, and, if text is identified in the location where a footer is likely to be found, then OCR can be performed to determine whether a (correctly oriented) page number is present. This variation can provide an additional level of assurance to circumvent the problem which occurs when an original document has both a header and a footer.

In one embodiment of the present invention the page orientation program uses optical character recognition ("OCR") to determine if an electronic representation of a page of a document is in a predetermined ("correct" or "preferred") orientation. OCR can be performed using a number of known OCR software programs. For example, the software program FineReader Standard 4.0 OCR, available from ABBYY Software House of Fremont, California can perform the OCR used in the method of the present invention. Most modern OCR software can closely duplicate the fonts of an original document, as well as the page format and layout (e.g., portrait and landscape formats, as well as other attributes) so that text, and non-text components such as charts, tables, columns, headers, footers, graphics and images, are all retained within the same document. Generally, OCR comprises taking a digital electronic representation of a document, and then comparing a portion of the digital representation (typically, an isolated area representative of one character) against a library of a set of recognized characters. When a statistically significant match is found between the two, then the character from the set of characters is established as the character in the digital representation. In this way the digital file can be converted to a set of editable characters.

The embodiment of the present invention which includes using OCR basically comprises a method of generating an image from an electronic representation of a page of a document (e.g., 200 of FIG. 4) to be imaged by an imaging device (e.g., 100 of FIG. 3). The method includes performing optical character recognition ("OCR") on at least a portion of the electronic representation of the page to obtain a digital representation of at least one character from the electronic representation of the page. The digital representation of the at-least-one character is then compared to a set of recognized characters, in the manner described above. A determination is then made whether or not the digital representation of the at-least-one character matches a character in the set of recognized characters. If the digital representation of the at-least-one character does not match a character in the set of recognized characters, then the electronic representation of the page is "rotated" (in the manner described above) so that it conforms to the predetermined (i.e., "correct") orientation of the page. Thereafter, the electronic representation of the page can be imaged to produce a copy product, or it can be stored on a computer readable memory device as a modified document file.

Figure 6A:
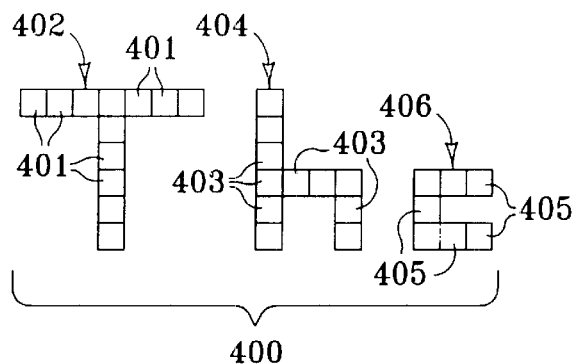
FIG. 6A depicts how a correctly oriented word in a portrait format can be represented by an optical character recognition program.
Figure 6B:
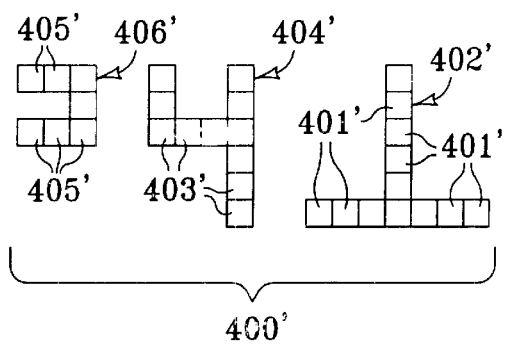
FIG. 6B depicts how a misoriented word in a portrait format can be represented by an optical character recognition program.

An example of this process is depicted in FIGS. 6A and 6*b*, which represent two different manners in which characters from a digital file of a document page can be presented for optical character recognition. FIG. 6A depicts a digital representation 400 of the word "The", which can be on a page, such as page 210 of FIG. 4, which is correctly oriented for imaging. FIG. 6B depicts another digital representation 400' of the word "The", which can be on a page, such as page 220 of FIG. 4, which is incorrectly oriented for imaging. As can be seen, the digital images 400 and 400' appear to be more like the letter sequence "The", versus the actual word "The". The misrepresentation of the letter "e" (406, 406') as "c" is not an uncommon occurrence in optical character recognition, and can result from (1) the quality of the original document presented for OCR, and (2) the robustness of the program or software performing the OCR. OCR software typically considers the digital file character-by-character, identifying a character by "while space" (null bits) between strings of non-null bits. Thus, OCR can identify the characters 402, 404 and 406 as respective images T, h, and ⊂ comprised of respective digital bits 401, 403 and 405, and characters 402', 404' and 406' as respective characters ⊥, 4 (modified) and ⊃ comprised of respective digital bits 401', 403' and 405'. That is, characters 402', 404' and 406' essentially constitute the inverted, mirrored images of respective characters 402, 404 and 406.

Typically, characters 402' and 406' (⊥ and ⊃, respectively) will not be recognized as characters within the set of characters, and so these characters will suggest that the document page is misoriented. However, the character 404' (like a modified "4") could be recognized as a "4", even though the character is in fact an inverted and mirrored "h". Thus, performing OCR on character 406' could suggest that the character is a legitimate character (i.e., the character "4"). Likewise, inverted and mirrored digital images of characters "O" and "I" will be identified as characters "O" and "I", and will therefore be considered as legitimate characters. Thus, performing OCR on only one or two characters can lead to an incorrect assumption about the orientation of the page. Accordingly, the method preferably includes performing the optical character recognition on at least a portion of the electronic representation of the page to obtain digital representations of at least three characters (and preferably more) from the electronic representation of the page. The digital representations of the at-least-three characters can then be compared to the set of recognized characters. If a majority of the digital representations of the at-least-three character matches do not match characters in the set of recognized characters, then electronic representation of the page is rotated to the correct orientation. That is, preferably statistical sampling is performed on a number of characters to determine if the page is correctly oriented. For example, OCR can be performed on 15 characters. The probability that 8 or more of inverted, mirrored images of characters will be interpreted as legitimate characters is relatively small, and therefore OCR can be performed on a relatively small portion of a page of the document to determine if the page is correctly oriented or not.

Figures 7A, 7B:
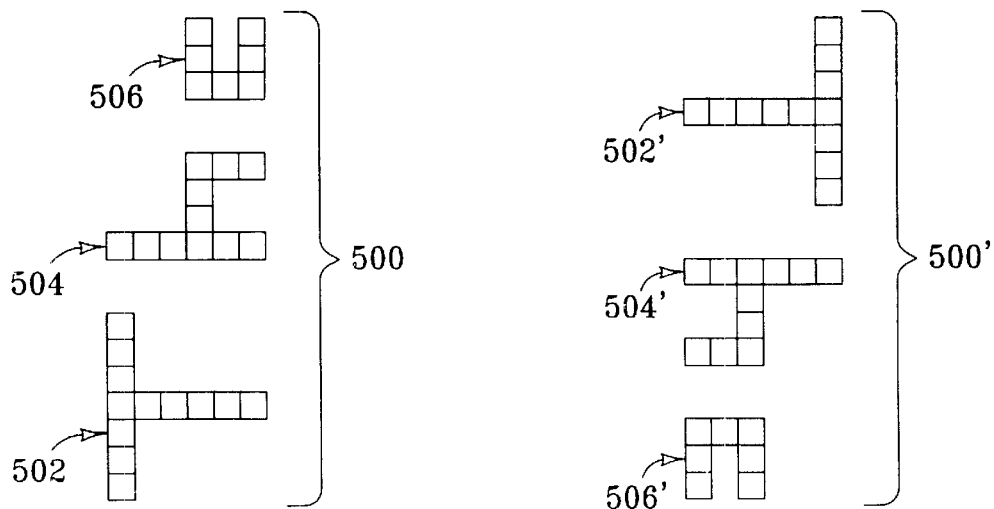
FIG. 7A depicts how a correctly oriented word in a landscape format can be represented by an optical character recognition program.
FIG. 7B depicts how a misoriented word in a landscape format can be represented by an optical character recognition program.

With respect to a page which is presented in landscape format (e.g., pages 230 and 250 of FIG. 4), FIG. 7A depicts a digital representation 500 of the word "The" as it can appear on page 250 of FIG. 4, while FIG. 7B depicts a digital representation 500' of the word "The" as it can appear on page 230 of FIG. 4. As described above with respect to FIG. 4, for a mixed format document (i.e., a document having both landscape format and portrait format pages), the orientation depicted in FIG. 7A is the "correct" orientation, while the orientation depicted in FIG. 7B is the "incorrect" orientation. If the OCR is performed under the assumption that both FIGS. 7A and 7B are in portrait format, then typically no conclusive result will be reached. This is due to the fact that the ninety-degree rotation of the characters (from a portrait format) is unlikely to match very few characters in the set of characters to which the digital images of the characters 502, 504, 506, 502', 504' and 506' is compared. That is, if FIGS. 7A and 7B are viewed in a portrait format, then the only probable matches are that character 506 can be construed as the letter "u", and character 506' can be construed as the letter "n". Accordingly, the page orientation program can be further configured to account for characters which are oriented in a landscape format, when the OCR is based on characters being presenting in a portrait format. To this end, when the digital representation of the at least one character does not match a character in the set of recognized characters, then the digital representation of at least one of the characters can be "rotated" by ninety degrees in a first direction. Then it can be determined whether the rotation of the digital representation of the character will cause the character to match a character in the set of recognized characters. If not, then the electronic representation of the page car be rotated. It does not matter if the "first direction" is clockwise or counterclockwise, so long as the page orientation program is configured to recognize a character match (or a non-match) after the rotation, and determine if the match or non-match is consistent with a particular page orientation.

For example, character 502 can be rotated ninety degrees clockwise. It will then (in all probability) match the character "T" in the set of recognized characters. Thus, it will be determined that the character set 500 (and consequently the page on which the character set is found) is in the "correct" orientation for the mixed-format document. However, if character 502' is rotated ninety degrees clockwise, it will still not match a character in the set of recognized characters. Consequently, the page on which the character set 500' is found should be rotated by 180 degrees so that it is "correctly" oriented (as described above with respect to page 230 in FIG. 4).

While we have described the above invention using examples of characters common to Western languages and conventions, it is understood that the same concepts can be applied to characters common to other languages and conventions which do not conform to Western languages and conventions. For example, if the characters (and the page formats) are in an Arabic language, or an Asian language such as Chinese or Japanese, then the orientations will essentially be reversed.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of formatting an electronic representation of a page of a document to be imaged by an imaging device, comprising:

determining if the electronic representation of the page is oriented in a predetermined orientation;

if the electronic representation of the page is not oriented in the predetermined orientation, rotating the electronic representation of the page so that the electronic representation of the page is in the predetermined orientation; and at least one of imaging the rotated electronic representation of the page, or storing the rotated electronic representation of the page in a computer readable memory;

and wherein the electronic representation of the page is imaged to produce a copy product, the method further comprising determining whether a finishing process is to be applied to the copy product, and rotating the electronic representation of the page only if the finishing process is to be applied to the copy product.

2. A method of formatting an electronic representation of a page of a document to be imaged by an imaging device, comprising:

determining if the electronic representation of the page is oriented in a predetermined orientation;

if the electronic representation of the page is not oriented in the predetermined orientation, rotating the electronic representation of the page so that the electronic representation of the page is in the predetermined orientation; and at least one of imaging the rotated electronic representation of the page, or storing the rotated electronic representation of the page in a computer readable memory;

and wherein the electronic representation of the page represents a first page of a multi-page document, the remainder of the multi-page document being represented by a secondary electronic representation, the method further comprising rotating the secondary electronic representation when the electronic representation of the first page is rotated.

3. A method of formatting an electronic representation of a page of a document to be imaged by an imaging device, and wherein the electronic representation of the page represents one page of a multi-page document, each page of the multi-page document being represented by an associated electronic representation, the method comprising:

determining if the electronic representation of the page is oriented in a predetermined orientation;

if the electronic representation of the page is not oriented in the predetermined orientation, rotating the electronic representation of the page so that the electronic representation of the page is in the predetermined orientation;

at least one of imaging the rotated electronic representation of the page, or storing the rotated electronic representation of the page in a computer readable memory;

determining if the associated electronic representation of each page of the multi-page document is oriented in a predetermine orientation;

for those pages where the associated the electronic representation of the page is not oriented in the predetermined orientation, rotating the electronic representation of the page so that the electronic representation of the page is in the predetermined orientation; and at least one of imaging the rotated electronic representations of the pages, or storing the rotated electronic representation of the pages in a computer readable memory;

and wherein determining if the electronic representation of each page is oriented in the predetermined orientation is performed using optical character recognition software on a preselected portion of the electronic representation of each page to determine whether a footer is present in the preselected portion.

4. Method of generating an image from an electronic representation of a page of a document to be imaged by an imaging device, comprising:

performing optical character recognition on at least a portion of the electronic representation of the page to obtain a digital representation of at least one character from the electronic representation of the page;

comparing the digital representation of the at least one character to a set of recognized characters;

determining if the digital representation of the at least one character matches a character in the set of recognized characters, and if the digital representation of the at least one character does not match a character in the set of recognized characters, rotating the electronic representation of the page; and imaging the electronic representation of the page to produce a copy product.

5. The method of claim 4, and further comprising optically scanning the document to generate the electronic representation of the page.

6. The method of claim 4 and further comprising:

performing the optical character recognition on at least a portion of the electronic representation of the page to obtain digital representations of at least three characters from the electronic representation of the page;

comparing the digital representations of the at least three characters to the set of recognized characters;

determining if a majority of the digital representations of the at least three character matches characters in the set of recognized characters, and if the majority of the at least three characters do not match characters in the set of recognized characters, rotating the electronic representation of the page.

7. The method of claim 4 and wherein the portion of the electronic representation of the page on which optical character recognition is performed represents an area of the page where a footer can be located.

8. The method of claim 4 and further comprising, when the digital representation of the at least one character does not match a character in the set of recognized characters:

determining whether rotating the digital representation of the at least one character by ninety degrees in a first direction will cause the digital representation of the at least one character to match a character in the set of recognized characters, and if not, rotating the electronic representation of the page.

9. An imaging device for generating a copy product from an electronic representation of a page of a document, comprising:
   an imaging section configured to generate the copy product from the electronic representation of the page of the document;
   a processor configured to execute steps of a computer executable program;
   a computer readable memory device comprising a page rotation algorithm configured to:
   be executed by the processor;
   determine if the electronic representation of the page is oriented in a predetermined orientation; and
   if the electronic representation of the page is not oriented in the predetermined orientation, rotate the electronic representation of the page so that the electronic representation of the page is in the predetermined orientation; and
   an optical scanner configured to optically scan a page of an original document to generate the electronic representation of the page of the document.

10. An imaging device for generating a copy product from an electronic representation of a page of a document, comprising:
    an imaging section configured to generate the copy product from the electronic representation of the page of the document;
    a processor configured to execute steps of a computer executable program;
    a computer readable memory device comprising a page rotation algorithm configured to:
    be executed by the processor;
    determine if the electronic representation of the page is oriented in a predetermined orientation; and
    if the electronic representation of the page is not oriented in the predetermined orientation, rotate the electronic representation of the page so that the electronic representation of the page is in the predetermined orientation;
    and wherein the imaging device is configured to generate a copy product from an electronic representation of pages of a multi-page document defined by a first page, and further wherein the page rotation algorithm is further configured to determine if the electronic representation of only the first page is oriented in the predetermined orientation.

11. An imaging device for generating a copy product from an electronic representation of a page of a document, comprising:
    an imaging section configured to generate the copy product from the electronic representation of the page of the document;
    a processor configured to execute steps of a computer executable program;
    a computer readable memory device comprising a page rotation algorithm configured to:
    be executed by the processor;
    determine if the electronic representation of the page is oriented in a predetermined orientation; and
    if the electronic representation of the page is not oriented in the predetermined orientation, rotate the electronic representation of the page so that the electronic representation of the page is in the predetermined orientation;
    a finishing device configured to apply a finishing process to the copy product; and wherein:
    the finishing device is selectable between an enabled state to apply the finishing process to the copy product, and a non-enabled state to not apply the finishing process to the copy product; and
    the page rotation algorithm is configured to be disabled when the finishing device is in the non-enabled state.

* * * * *